(12) United States Patent
Shiga et al.

(10) Patent No.: US 6,522,283 B1
(45) Date of Patent: Feb. 18, 2003

(54) WIRELESS KEYBOARD

(75) Inventors: Sadakazu Shiga, Fukushima-ken (JP); Norio Abe, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/416,974

(22) Filed: Oct. 12, 1999

(30) Foreign Application Priority Data

Oct. 12, 1998 (JP) ............................................ 10-289819

(51) Int. Cl.[7] .............................................. G08C 17/00
(52) U.S. Cl. ...................... 341/176; 345/168; 359/142; 455/151.4
(58) Field of Search ................... 341/176, 22; 345/168, 345/169; 359/142, 152; 455/151.4; 367/197; 340/825.69, 825.72, 825.22

(56) References Cited

U.S. PATENT DOCUMENTS

| | | | | |
|---|---|---|---|---|
| 5,081,628 A | * | 1/1992 | Maekawa et al. ........... 359/142 |
| 5,307,297 A | * | 4/1994 | Iguchi et al. ................ 345/169 |
| 5,412,377 A | * | 5/1995 | Evans et al. ............ 340/825.22 |
| 5,473,317 A | * | 12/1995 | Inomata et al. ......... 340/825.25 |
| 5,600,313 A | | 2/1997 | Freedman ...................... 341/22 |
| 6,243,035 B1 | * | 6/2001 | Walter et al. ................ 341/173 |
| 6,437,836 B1 | * | 8/2002 | Huang et al. .......... 340/825.24 |

* cited by examiner

Primary Examiner—Michael Horabik
Assistant Examiner—Hung Dang
(74) Attorney, Agent, or Firm—Brinks Hofer Gilson & Lione

(57) ABSTRACT

A wireless keyboard, provided with an optical signal transmitter, includes an inputting function to an information processing device and a control function of an electrical appliance. The wireless keyboard includes a plurality of manufacturer codes for selectively performing optical control of a specific electrical appliance of a specific manufacturer. The electrical appliance is controlled by selecting a specific manufacturer code from the manufacturer codes and transmitting the specific manufacturer code. It is preferable that the wireless keyboard includes an abbreviation symbol corresponding to each manufacturer code. The manufacturer code is selected by inputting the abbreviation symbol.

5 Claims, 3 Drawing Sheets

WIRELESS KEYBOARD

BACKGROUND OF THE INVENTION

1. Field of the Invention

The present invention relates to wireless keyboards, and, more particularly, to an optical wireless keyboard used as an input terminal of an information processing device, such as a computer or a communication device, wherein the remote control function of electrical appliances is combined.

2. Description of the Related Art

Various information processing devices, such as personal computers (hereinafter referred to as a "PC"), employ a keyboard as an input unit, which is provided with letter keys for inputting characters, e.g. letters and numbers, and function keys for performing various control functions. Known keyboards are connected through a cable to the information processing devices. As the PC has become more popular in general households, there has been a problem that the cable is obstructive or too short for satisfactory use. To solve this problem, a wireless keyboard employing infrared rays has recently been developed.

Along with the recent popularization of the PC, there is a growing demand for taking image information from a television (hereinafter referred to as a "TV") or a videocassette recorder (hereinafter referred to as a "VCR") or music information from a CD player or an audio cassette player into the PC. It is thus necessary to connect imaging devices and music devices to the PC. However, even when the imaging devices and the music devices are connected to the PC, they still are controlled by their own control units. Recent imaging devices and music devices are remotely controlled using infrared rays, and hence each device is equipped with a remote controller. The names, locations, and forms of control buttons, as well as the operating procedures differ for each remote controller. Therefore, it is burdensome to prepare a plurality of exclusive remote controllers attached to various electrical appliances around a user, who selects each remote controller for each device and operates the remote controller separately from the keyboard. Mistakes are likely to be made.

There is a commercial-type remote controller which can be used in common by various optically-controlled TVs and the like. However, such a remote controller cannot be used unless a manufacturer code is preset by inputting a symbol corresponding to the manufacturer code, which is defined for performing selective, optical control of specific electrical appliances and which is different for each manufacturer. In general, the symbols corresponding to the manufacturer codes are number sequences. A list of number sequences is separately attached to each device, and hence there is no problem in the initial setting. However, the list is prone to be lost, and, once the list is lost, it is impossible to reset the remote controller when the batteries are changed or the remote controller of a different manufacturer is set.

SUMMARY OF THE INVENTION

Accordingly, it is an object of the present invention to provide an apparatus which prevents complexity and mistakes caused by controlling electrical appliances by separate remote controllers during operation of a keyboard.

To this end, there is provided a wireless keyboard provided with an optical signal transmitter, which includes an inputting function to an information processing device and a control function of an electrical appliance. The wireless keyboard according to the present invention eliminates the burden of providing a cable because it is wireless. The single wireless keyboard performs inputting to the information processing device and control of the electrical appliances, dispensing with a plurality of remote controllers for the electrical appliances, except for the keyboard itself.

It is preferable that embedded in the wireless keyboard is a plurality of manufacturer codes, for controlling the electrical appliances, from which a specific manufacturer code is selected and transmitted to control the electrical appliance. Because a plurality of transmittable manufacturer codes are embedded in the wireless keyboard, the single wireless keyboard may selectively control various electrical appliances of different manufacturers.

Preferably, embedded in the wireless keyboard is an abbreviation symbol corresponding to each manufacturer code. The abbreviation symbol may be input to select the manufacturer code. In transmission of the manufacturer code of the electrical appliance, it is not necessary to input a complex number sequence but to input an abbreviated symbol, such as a manufacturer abbreviation. Therefore the wireless keyboard according to the present invention facilitates a pre-setting procedure.

It is preferable that the manufacturer code is input by operation of letter keys on the wireless keyboard. Thus, it is possible to set the manufacturer code by using the general keys on the keyboard.

Preferably, the wireless keyboard is designed to display control-operation information for performing control on a display unit of the information processing device when controlling the electrical appliances. Thus, even if the manufacturer code or the abbreviation symbol is forgotten, it is possible to display a list of manufacture codes and abbreviation symbols, as well as a control procedure of the electrical appliances, on the display unit when necessary.

The wireless keyboard may include at least one of a target switching key for switching the transmission target between the information processing device and the electrical appliance and an operation-control key for controlling the operating state of the specific electrical appliance. Thus, the single wireless keyboard can perform switching between the input to the information processing device and the control of the electrical appliance as well as operating-state control of the electrical appliance.

DESCRIPTION OF THE PREFERRED EMBODIMENT

The present invention will be understood from the following description of the preferred embodiment taken in conjunction with the accompanying drawings.

Figure 1:
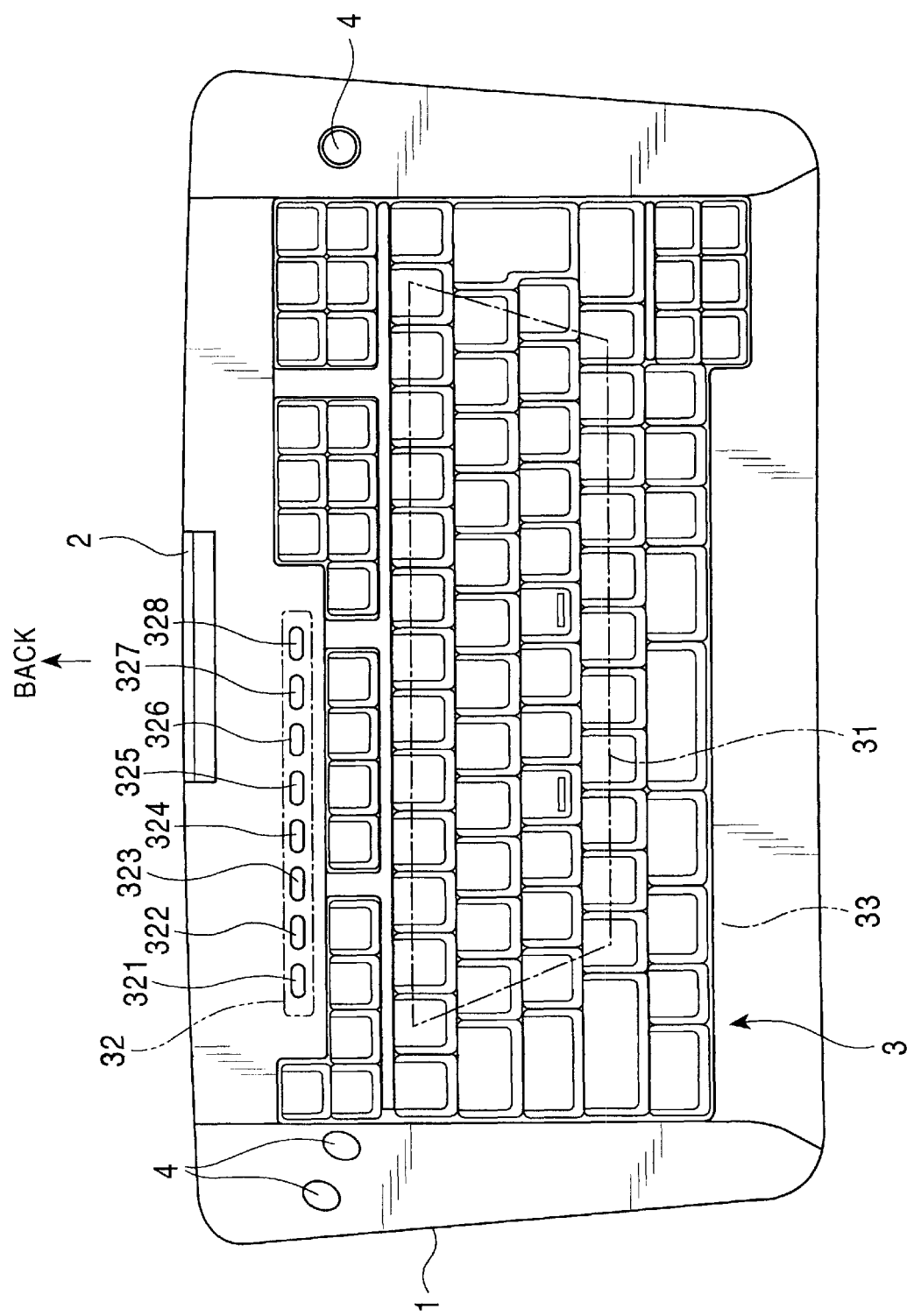
FIG. 1 is a plan view of a wireless keyboard according to an embodiment of the present invention.

Referring to FIG. 1, a wireless keyboard according to an embodiment of the present invention includes a keyboard 1 and an optical signal transmitter 2 provided at the back of the keyboard 1 for transmitting infrared signals. A key region 3 in which a number of keys are disposed and a mouse-function part 4 are provided on the top surface of the keyboard 1.

The key region 3 is divided into three key groups: a letter (character) key group 31 occupying the central part of the key region 3; an electrical appliance control key group 32 disposed at the back part of the key region 3; and a function key group 33 for performing other functions.

The letter key group 31 consists of keys corresponding to letters and numbers. The electrical appliance control key group 32 includes target switching keys 321, 322, and 326 for switching the transmission target between the inputs to a PC and the control of an electrical appliance, and operation control keys 323, 324, 325, 327, and 328 for controlling the operating state of the electrical appliance. The function key group 33 consists of keys for performing input control of an information processing device.

The electrical appliance control key group 32 of the wireless keyboard includes, sequentially from the left end, a PC key (PC power supply key) 321, a TV key (TV power supply key) 322, a TV channel switching key 323, a TV volume adjusting key (+) 324, a TV volume adjusting key (−) 325, a VCR key (VCR power supply key) 326, a VCR playback key 327, and a VCR stop key 328.

The wireless keyboard is embedded therein with a plurality of manufacturer codes defined for each manufacturer for selectively performing optical control of TVs and VCRs of major manufacturers. A manufacturer code may be selected from the manufacturer codes and set as necessary. Once the manufacturer code is set, until it is changed, the wireless keyboard selects a specific target with a specific key operation and transmits an optical signal based on the set manufacturer code to the target.

Figure 2:
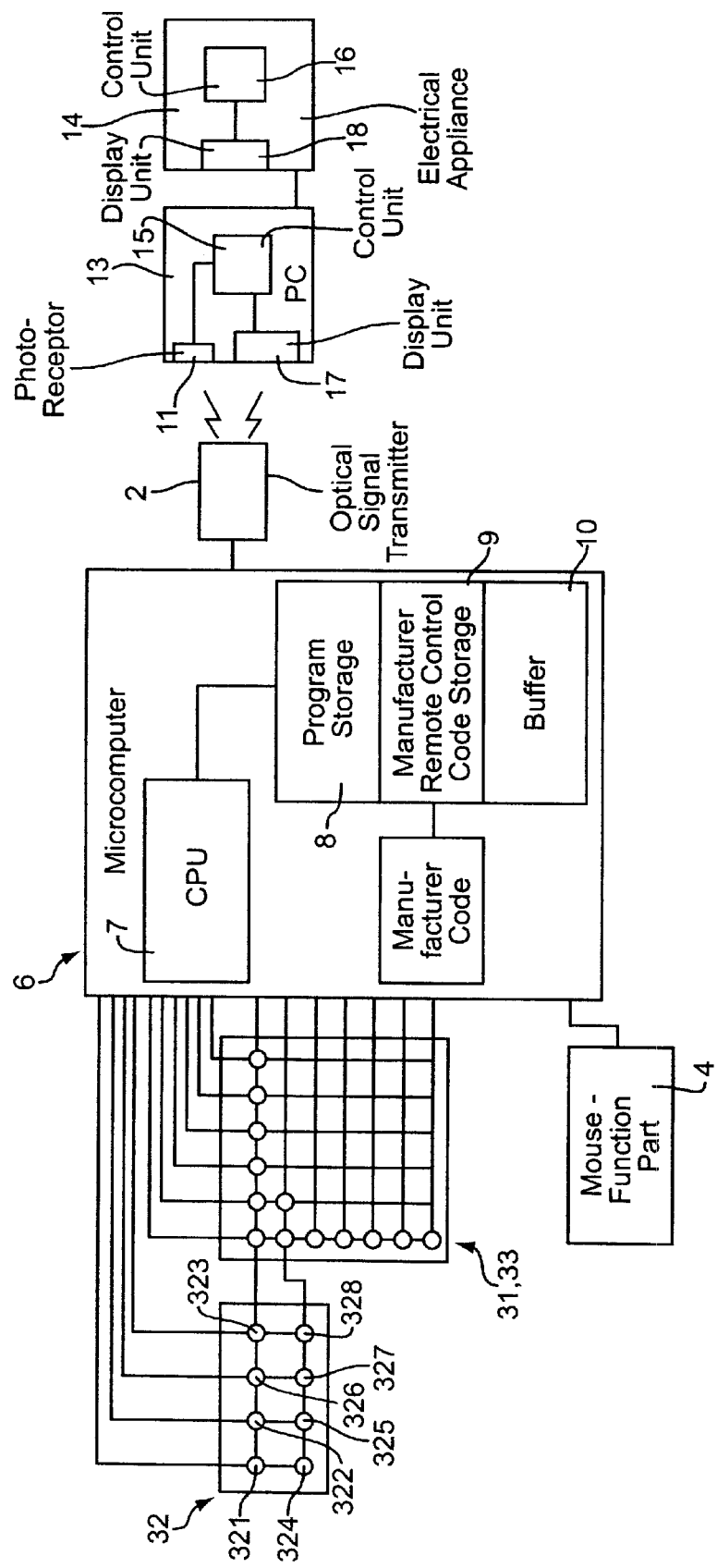
FIG. 2 is a block diagram of a system incorporating the wireless keyboard according to the embodiment of the present invention.

The PC 13 (see FIG. 2), which is a target in the above description, includes a function of receiving and processing the infrared signal transmitted from the optical signal transmitter 2 and a display unit 17 (see FIG. 2). In the embodiment, the electrical appliances are a TV and a VCR, which are operated by infrared remote control. Each of the TV and the VCR includes functions of receiving the infrared signal based on each manufacturer code, which is transmitted from the optical signal transmitter 2, and operating in accordance with the instruction of the infrared signal.

Pushing the PC key 321 switches on the PC 13 and the display unit 17 by means of the optical signal. In this mode (hereinafter referred to as a "PC mode"), the wireless keyboard is used as a PC-exclusive keyboard as in normal operation.

Next, a manufacturer-code setting is performed for the TV of a specific manufacturer. In the embodiment, when the TV key 322 is pushed for at least two seconds in the PC mode, a list of TV manufacturer names corresponding to the manufacturer codes embedded in the keyboard, model names, and abbreviation symbols (e.g. "ALPS TV" if the TV to be set is a product of Alps Electric Co.) will be displayed on a screen of the display unit 17. A user selects the corresponding abbreviation symbol, inputs the selected abbreviation symbol using the letter key group 31 on the keyboard, and pushes a CR (carriage return) key, thereby translating the abbreviation symbol into the corresponding manufacturer code and setting the manufacturer code in the wireless keyboard. Hereafter, the wireless keyboard turns on/off the TV of the specific manufacturer every time the TV key 322 is pushed for a short time period (less then two seconds), regardless of whether the PC key is turned on or off. When the PC key is turned on, the PC 13 can be operated independently of the TV.

After the TV manufacturer code has been set, a state (hereinafter referred to as a "TV mode") is activated in which the TV is turned on by the TV key 322. In the TV mode, pushing the TV channel switching key 323 switches TV channels in a sequential cycle; pushing the TV volume adjusting key (+) 324 gradually increases the volume while being pushed; and pushing the TV volume adjusting key (−) 325 gradually decreases the volume while being pushed.

To control the VCR of a specific manufacturer, a manufacturer code is set in a manner similar to the TV manufacturer-code setting. In the embodiment, when the VCR key 326 is pushed for at least two seconds in the PC mode, a list of VCR manufacturer names corresponding to the manufacturer codes embedded in the keyboard, model names, and abbreviation symbols ("ALPS VCR" if the VCR to be set is a product of Alps Electric Co.) will be displayed on the screen of the display unit 17. The user selects the corresponding abbreviation symbol, inputs the selected abbreviation symbol using the letter key group 31 (and the function key group 33 if necessary) on the keyboard, and pushes the CR key, thereby translating the abbreviation symbol into the corresponding manufacturer code and setting the manufacturer code in the wireless keyboard. Hereafter, the wireless keyboard turns on/off the VCR of the specific manufacturer independently of the PC 17 every time the VCR key 326 is pushed for a short time period (less then two seconds).

After the VCR manufacturer code has been set, a state (hereinafter referred to as a "VCR mode") is activated when the VCR is turned on by the VCR key 326. In the VCR mode, pushing the VCR playback key 327 plays back a video tape; pushing the VCR stop key 328 stops the playback of the video tape; simultaneously pushing the VCR key 326 and the VCR playback key 327 fast-forwards the video tape while being pushed; and simultaneously pushing the VCR key 326 and the VCR stop key 328 rewinds the video tape while being pushed.

FIG. 2 is a block diagram of a system incorporating the wireless keyboard of the present invention. Referring to FIG. 2, there are provided the key region 3 including the electrical appliance control key group 32, the letter key group 31, and the function key group 33; the mouse-function part 4; a microcomputer 6 connected to each key of the key region 3 and to the mouse-function part 4; and the optical signal transmitter 2 which transmits the output signal from the microcomputer 6 as an optical signal. The microcomputer 6 includes a CPU 7, a program storage 8, a manufacturer remote control code storage 9, and a buffer 10. The microcomputer 6 controls the wireless keyboard 1 and outputs a control signal generated by operation of the key group 3. In the manufacturer remote control code storage 9, TV and VCR remote control codes corresponding to various manufacturers or PC codes are stored. Operating the key region 3 invokes a specific manufacturer code from the CPU 7, thus setting the specific manufacturer code.

With continued reference to FIG. 2, a PC 13 provided with a photoreceptor 11 and an electrical appliance 14, such as the TV or the VCR, are shown. The PC 13 and the electrical appliance 14 are provided with control units 15 and 16, respectively, for controlling the PC 13 and the electrical appliance 14 based on the control signal received by the photoreceptor 11, and display units 17 and 18, respectively.

When the PC key 321 is turned on, the PC control signal is transmitted by the CPU 7 and the program storage 8 from the transmitter 2, thus activating the PC 13. Accordingly, the letter key group 31, the function key group 33, and the mouse-function part 4 are to be used exclusively by the PC 13.

Figure 3:
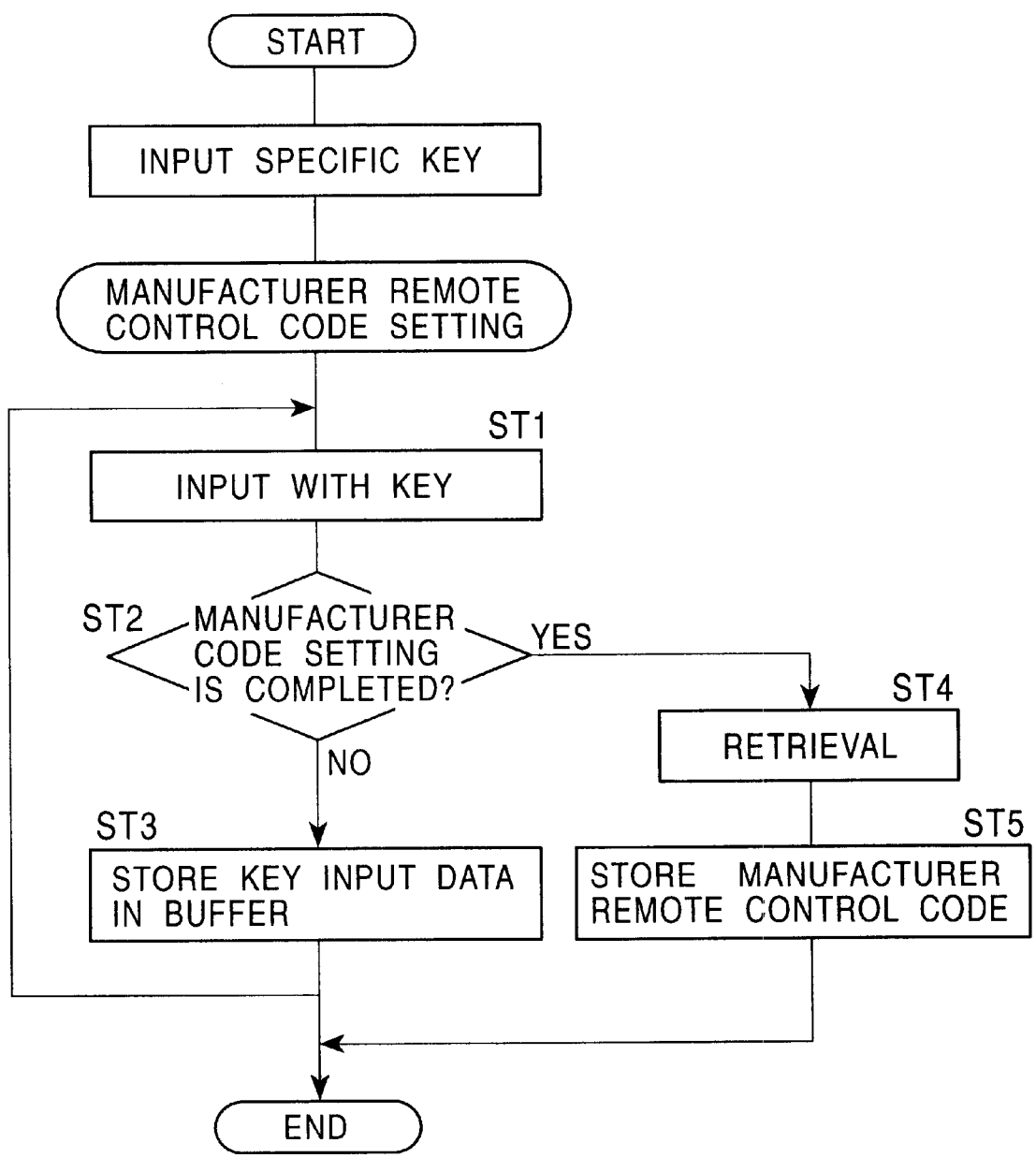
FIG. 3 is a flowchart of a process for setting a manufacturer remote control code of the wireless keyboard according to the embodiment of the present invention.

Now referring to FIG. 3, a flowchart is illustrated describing a process of setting a manufacturer remote control code of a specific manufacturer. In normal operation, a specific key or a combination of specific keys is operated to activate a state in which a manufacturer-code setting is performed. If the process is performed to set a TV manufactured by Alps Electric Co., a letter "A" is input with a key in step ST1. In step ST2, the process determines whether the manufacturer-code setting is completed. If the determination result is negative, the letter "A" key data is stored in the buffer 10 in step ST3. Subsequently, letters "L", "P", "S", "T", and "V" are input with the respective keys and each key data is sequentially stored in the buffer 10. After the input of the letter "V", a termination key is entered, whereby the process determines that the manufacturer-code setting is terminated in step ST2. In step ST4, a manufacturer code is retrieved from the key data stored in the buffer 10. In step ST5, the manufacturer code and the key data of the abbreviation symbol are arranged in a pair to be stored in the manufacturer remote control code storage 9, thus terminating the process.

The same process is performed for setting the VCR.

Accordingly, the manufacturer-code setting is completed. When the TV key 322 or the VCR key 326 is pushed for at least two seconds, the PC control signal and the TV/VCR control signal, which are generated by the CPU 7, the program storage 8, and the manufacturer remote control code storage 9, are transmitted from the transmitter 2, thereby activating the PC 13 and the TV/VCR 14. Simultaneously, the list containing the manufacturer name, the model name, and the abbreviation symbol of the TV or the VCR which has been set in the above process is displayed on the display unit 17.

The present invention has been described in the context of the preferred embodiment wherein the wireless keyboard performs switching between the PC, the TV, and the VCR, turning on/off the TV and the VCR, and operation control of the TV and the VCR using the electrical appliance control key group 32 consisting of eight keys disposed at the back part of the keyboard region 3. However, it is applicable to other devices as long as the wireless keyboard of the present invention includes the inputting function to the information processing device and the control function of the electrical appliances. The present invention is not limited by the foregoing description of the embodiment and various changes in the types and the quantity of the targets, i.e. the information processing device and the electrical appliances, the location of the electrical appliance control key group on the keyboard, the quantity of the keys, and the control functions are possible without departing from the spirit and scope of the invention.

What is claimed is:

1. A wireless keyboard comprising an optical signal transmission segment having an input function for an information processing device and a control function for an electrical appliance, wherein a plurality of manufacturer codes defined for optically controlling an electrical appliance built by a particular manufacturer are stored, wherein the input function of the optical signal transmission segment allows information relating to the manufacturer codes or operating information for controlling the electrical appliance to be displayed in a display device of the information processing device, and wherein a manufacturer code can be selected based on the displayed information and transmitted to control the electrical appliance.

2. A wireless keyboard according to claim 1, further comprising an abbreviation symbol corresponding to each manufacturer code, wherein the manufacturer code is selected by inputting the abbreviation symbol.

3. A wireless keyboard according to claim 1, wherein the manufacturer code is inputted using letter keys on the wireless keyboard.

4. A wireless keyboard according to claim 1, further comprising a target switching key for switching the transmission target between the information processing device and the electrical appliance.

5. A wireless keyboard according to claim 1, further comprising an operation-control key for controlling the operating state of the electrical appliance.

* * * * *